Oct. 31, 1939.   C. S. HAZARD   2,178,229
COMPUTING REGISTER CONSTRUCTION
Filed Dec. 5, 1936   2 Sheets-Sheet 1
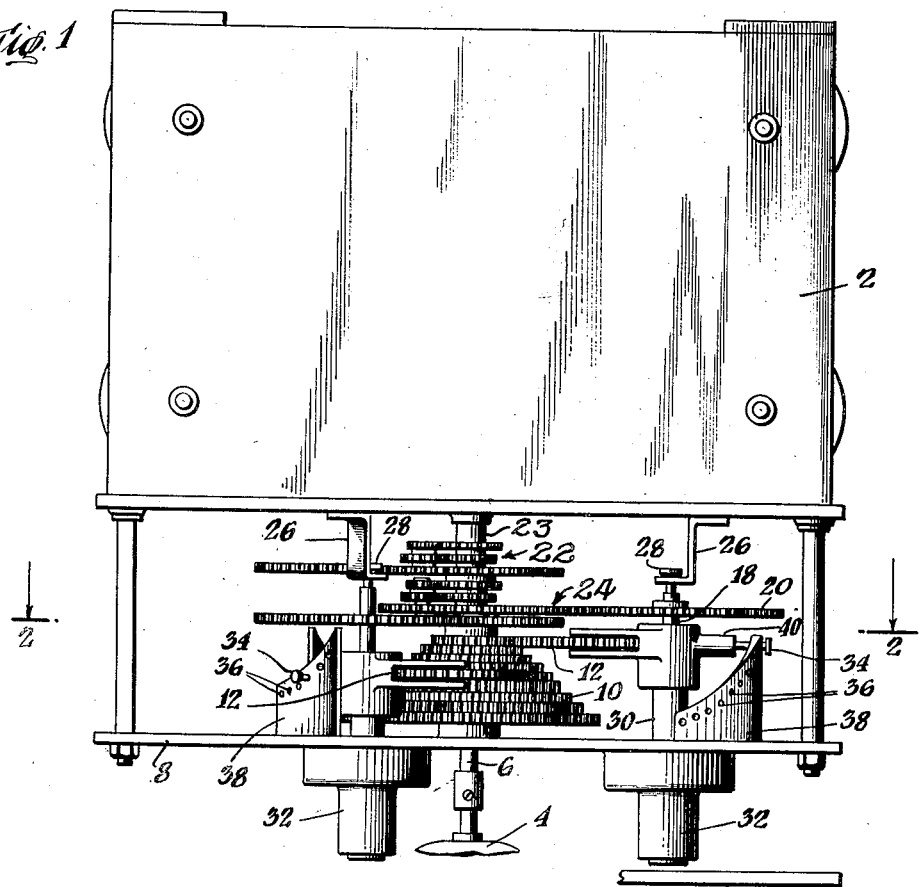
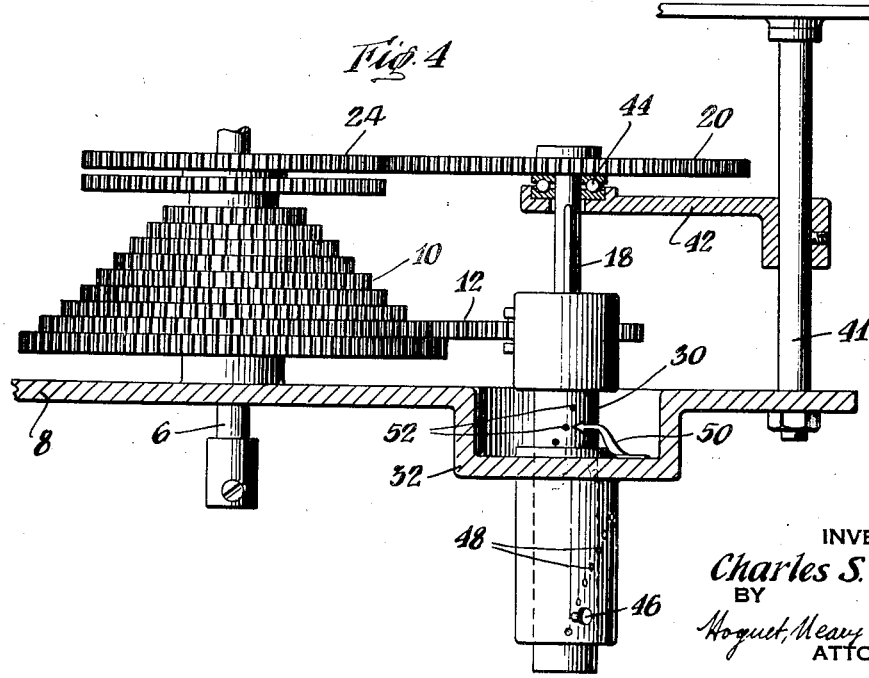
INVENTOR
Charles S. Hazard
BY
Hoguet, Neavy & Campbell
ATTORNEYS

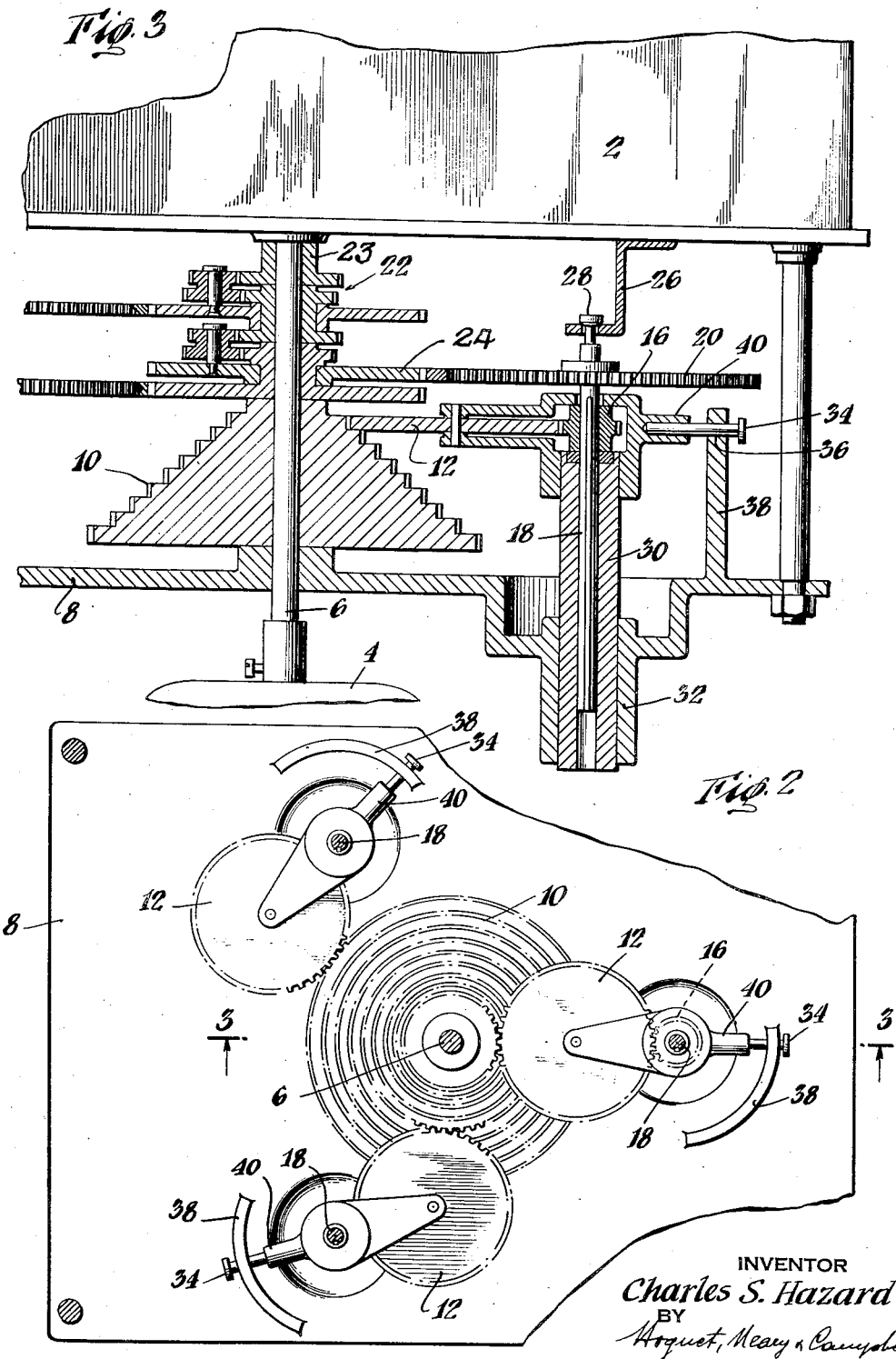

Patented Oct. 31, 1939

2,178,229

UNITED STATES PATENT OFFICE 2,178,229

COMPUTING REGISTER CONSTRUCTION

Charles S. Hazard, New York, N. Y., assignor to Neptune Meter Company, a corporation of New Jersey Application December 5, 1936, Serial No. 114,313

1 Claim. (Cl. 74—348)

This invention relates to registering devices and is directed particularly to meter driven devices operable at varying speeds for indicating the cost of a commodity dispensed.

Registering devices which compute the cost of a commodity as it is dispensed must be adjustable to render them accurate upon changes in price per unit of the commodity delivered. The driving means heretofore provided in registering devices of this character have required considerable power for their operation and therefore have not been adapted for use in constructions wherein the power available for their operation is limited. For example, such registers could not heretofore be driven directly from meters which develop but little torque such as nutating disc meters or oscillating or rotating piston types of meters, although meters of this type are simple in construction and accurate in measurement and therefore preferable in many constructions.

The resistance to operation of adjustable computing registers as heretofore constructed has not been due to the registering elements so much as to the construction of the variable speed driving connections which permit adjustment of the mechanism for operation at different prices.

In accordance with the present invention, the driving connection between the meter and the register are so improved that the register may be operated by devices which develop but little power or torque such as nutating disc meters or oscillating or rotary piston meters.

One of the objects of the present invention is to provide an improved registering device having a novel driving connection between the registering elements and the source of power for operating the register.

Another object of the invention is to provide an adjustable computing register requiring very little power for operation thereof.

A further object of the invention is to provide a dispensing device having a meter of the type which develops but little torque and a variable register for indicating the cost of the commodity dispensed with a driving connection between the meter and register so constructed as to take up lateral thrust and maintain the elements thereof in the desired driving relation under all conditions of operation.

These and other objects and features of the invention will appear from the following description thereof, in which reference is made to the accompanying figures of the drawings:

Fig. 1 is a view in elevation of a typical form of registering device embodying the present invention with a portion of the casing removed;

Fig. 2 is a horizontal sectional view illustrating certain details of the form of the invention shown in Fig. 1 taken on the line 2—2 thereof.

Fig. 3 is a vertical sectional view of the construction illustrated in Fig. 1, taken on the line 3—3 of Fig. 2; and Fig. 4 is a view in elevation of an alternative form of mechanism embodying the present invention.

In that form of the invention chosen for purposes of illustration in Figs. 1 to 3 of the drawings, the device embodies a register 2, which may be of any suitable or conventional type for computing the cost of a commodity delivered by the mechanism.

The numeral 4 indicates a meter of a type which develops but little torque. Typical of such meters are nutating disc meters and meters embodying oscillating or rotary pistons. A drive shaft 6 connected to the meter 4 extends above a support 8 connected to the casing of register 2 and is provided at its upper end with a cone of gears 10 of progressively decreasing diameter.

Computing constructions of this type are well known in cost computing registers for liquid dispensing pumps and embody a number of gears 12, say three such gears, each of which is selectively movable into and out of engagement with the gears of cone 10 to cooperate therewith in driving the register at a speed corresponding to the price per unit of the liquid, such as gasoline, to be dispensed. Each of the gears 12 also meshes with a slidable gear 16 associated therewith to drive one of the shafts 18 at a selected speed. The gears 16 are keyed to the shaft with which they are associated but are slidable axially with respect to the shaft so as to remain in engagement with the cooperating gear 12 when the gear 12 is in engagement with any one of the gears of cone 10. The shaft 18 may thus be driven at any desired speed depending upon the ratio of gear 12 with respect to a selected gear of the cone 10 and corresponding to the cost of the commodity to be dispensed.

The shafts 18 are each provided with a gear 20 for engagement with one of the gears of a planetary gear system indicated generally at 22 in Fig. 1, from which the cost indicating mechanism of the register 2 is driven by a sleeve 23.

One of the shafts 18 drives one of the gears, say gear 24, of the planetary system at one speed through the gear 20 carried thereby, whereas the other two shafts each drive another gear of the planetary system at a selected speed through the gear 20 carried by it. Generally the speed of rotation of one of the shafts 18 determines the number of tenths of a cent in price; the speed of another shaft determines the number of cents from 1 to 10 and the speed of the third shaft determines the number of cents in 10's permitting adjustment of the ratio between the speed of operation of the meter driven shaft 6 and the operation of the indicating elements of the register 2 for any price between one tenth of a cent and one dollar.

In accordance with the present invention, the shaft 18 and the slidable gear 16 and cooperating gear 12 are so supported and arranged that the resistance to operation of the register by the meter with these elements impose is negligible. As shown in Figs. 1 and 3, the shaft 18 may be supported by a bracket 26 on the register housing. The upper end of the shaft 18 is provided with a head 28 having a rounder lower surface engaging the bracket so that limited pivotal movement of the shaft incidental to operation thereof will not present resistance to the rotation thereof.

The shaft 18 depends from the bracket 26 and the lower end thereof extends into a movble sleeve 30 which is sildably movable in a boss 32 on the support 8. The sleeve 30 carries the slidable gear 16 and the cooperating gear 12 and is held in position with the gear 12 engaging a selected one of the cone of gears 10 by suitable means such as the pin 34. The pin 34 projects through a selected opening 36 in the arcuate plate 38 and extends into an opening in a boss 40 on sleeve 30.

The sleeve when so supported maintains the shaft 18 and the gears 16 and 12 in alignment and provides a thrust bearing for the gears and a lateral bearing for the shaft. Thus any tendency for the parts supported by pin 34 to sag will not place any strain on the shaft 18 and its bearings and will not permit tilting or canting of gears 16 and 12 with respect to shaft 18. The force required to drive these elements and the register is thereby reduced so that the register may be driven from a source which develops but little power such as a nutating disc or an oscillating or rotating piston type of fluid meter.

In that form of the invention illustrated in Fig. 4 the support for shaft 18 is carried by a post 41 supporting the register casing and is in the form of an arm 42 carrying one of the races for roller bearings 44 to reduce the power required to drive the shaft 18. The outer surface of the sleeve 30 in this construction is provided with a recess (not shown) which is engageable by a pin 46 projecting through openings 48 in the downwardly extending boss 32 on the support 8. An index pointer 50 on the support aligns with markings 52 on the sleeve to indicate the position of the sleeve corresponding to different prices of the commodity to be dispensed.

This construction like that of Figs. 1 to 3 provides a thrust bearing for gears 16 and 12 and a lateral bearing for the shaft so that canting or tilting of the gears with respect to the shaft and strain upon the shaft 18 is reduced and the register may be driven directly from a meter or other device developing but little power.

While certain typical embodiments of the invention have been illustrated and described to indicate the nature of the invention it will be evident that numerous changes may be made in the construction and arrangement of the elements particularly in adapting the invention to other uses. It should therefore be understood that the invention is not limited to the particular construction illustrated except as defined by the claim.

I claim:

In a variable speed driving connection, the combination of a supporting member, a cone of gears supported adjacent said member and adapted to be actuated by a source of power, a shaft, said supporting member being provided with an elongated boss, a sleeve surrounding said shaft and fitted in said boss for adjustable movement axially of said shaft, a pair of intermeshing gears supported by said sleeve, one of said pair of gears being selectively engageable with the gears of said cone and the other of said pair of gears being slidably engaged to said shaft, said boss being provided with a plurality of axially spaced apertures, said sleeve having a recess in the outer surface thereof, and means receivable in any one of said apertures and engageable with said recess for securing said sleeve in any one of several positions for procuring the desired engagement of said one gear with the gears of said cone.

CHARLES S. HAZARD.